(12) United States Patent
Kanie et al.

(10) Patent No.: US 6,484,370 B2
(45) Date of Patent: Nov. 26, 2002

(54) MOLDING FASTENING ASSEMBLY

(75) Inventors: H. Kanie, Toyohashi (JP); M. Kato, Toyota (JP)

(73) Assignee: Emhart LLC, Newark, DE (US)

( * ) Notice: Subject to any disclaimer, the term of this patent is extended or adjusted under 35 U.S.C. 154(b) by 0 days.

(21) Appl. No.: 09/861,215

(22) Filed: May 18, 2001

(65) Prior Publication Data

US 2001/0045757 A1 Nov. 29, 2001

(30) Foreign Application Priority Data

May 19, 2000 (JP) ........................................ 2000-147819

(51) Int. Cl.⁷ ............................................... A44B 21/00
(52) U.S. Cl. ......................................................... 24/297
(58) Field of Search .................. 24/289, 297, 293–295, 24/581.11, 669

(56) References Cited

U.S. PATENT DOCUMENTS

| | | | |
|---|---|---|---|
| 3,631,569 A | * | 1/1972 | Heath et al. |
| 3,700,206 A | * | 10/1972 | Jones |
| 3,771,275 A | * | 11/1973 | Seckerson |
| 3,943,610 A | * | 3/1976 | Meyer |
| 5,094,580 A | * | 3/1992 | Abe |
| 5,106,223 A | * | 4/1992 | Kraus |
| 5,353,571 A | * | 10/1994 | Berdan et al. |
| 5,651,634 A | * | 7/1997 | Kraus |
| 6,276,109 B1 | * | 8/2001 | Hingorani et al. |

FOREIGN PATENT DOCUMENTS

JP         2000-81013         *   3/2000

\* cited by examiner

*Primary Examiner*—James R. Brittain
(74) *Attorney, Agent, or Firm*—Edward D. Murphy

(57) ABSTRACT

A molding fastener assembly 1 to connect a molding to a vehicle body. The molding fastener assembly 1 having a clip 3 including a base 25 and a molding holder 26 integrated with the base, and a blind rivet 2 including a rivet body 11 having a flange 10 at one end thereof and a mandrel 13 extending through the rivet body beyond the flange from the other end thereof opposite to the flange. The rivet body 11 is covered with a tubular resin cap 5 extending from the tip end of the rivet body toward the flange. The resin cap 5 is formed with a first flange 21 at a position spaced apart from the rivet body flange 10 toward the one end of the rivet body by a predetermined distance equal to or more than the thickness of the clip base 25. The mandrel is adapted to be pulled off to secure the rivet body with the resin cap to a vehicle body while keeping the resin cap flange in contact with the vehicle body and keeping the rivet body flange at the predetermined distance from the vehicle body. The clip base 25 includes a recess 27 for receiving a shank 22 between the rivet body flange 10 and the resin cap flange 21, and an engagement pawl 29 provided at an inlet of the recess. The engagement pawl is formed in a configuration to prevent the shank 22 received in the recess from coming off the recess.

1 Claim, 5 Drawing Sheets

MOLDING FASTENING ASSEMBLY

BACKGROUND OF THE INVENTION

The present invention relates to a molding fastener assembly for mounting a molding to a vehicle body. In particular, the present invention relates to a molding fastener assembly suitable for mounting a side molding for filling in a gap between an edge of a windshield and a vertical wall of a vehicle body adjacent to an opening of the vehicle body to which the windshield is mounted.

A windshield molding for covering the gap caused between the windshield and the vehicle body is formed in an elongated shape in connection with the shape of the gap, and it is necessary for the molding to be securely fastened over its entire length to guard against the strong wind pressure acting on the windshield. Generally, in the body vertical wall opposite to the windshield edge to be fixed to the body opening, an elongate-shaped retainer for fastening a metallic molding is firmly fixed over a predetermined range of the body vertical wall along the gap between the windshield edge and the body opening by a rivet or the like. Then, an engagement edge of the elongate molding is fitted into and fastened on this retainer. Stainless steel, so-called SUS material, is used for the retainer in view to rust prevention. However, it has been required to spend a lot of labor and cost for manufacturing processes, for example, of bending and pressing the stainless steel in conformity with the shape of the gap. In order to cope with this problem, a molding fastener assembly has been developed which is directed to maintain high strength of fastening various moldings including the windshield molding and to achieve cost-reduction by facilitating the operations for fixing a clip of the fastener assembly.

The above noted molding fastener assembly comprises a known blind rivet, and a resin clip including a base to be fixed to a vehicle body and a platy molding holder continuously extending from the base. The clip base is formed with a hole for receiving a hollow rivet body of the blind rivet. The rivet body of the blind rivet is inserted into the hole of the base and a hole of the vehicle body, and then a mandrel of the blind rivet is strongly pulled off to break it with the use of a fastening or clamping tool so as to retain the clip firmly to the vehicle body. The molding holder of the clip includes a clamp portion for receiving and sandwiching an engagement end of the molding, and an engagement pawl serving as a coming-off preventing mechanism. The clip is further formed with an engagement portion projecting from the clamp portion and the engagement pawl, viewed from the direction of inserting the molding, to be engaged with a cutout of the molding. The engagement portion is formed with a slit to be engaged with the edge of the molding cutout to retain the molding. The molding is formed with the cutout to be engaged with the molding-cutout engagement portion. Thus, by a simple operation of positioning the molding to match the molding cutout with the molding-cutout engagement portion of the clip and moving the molding with respect to the clip along the wall surface of the vehicle body, the engagement end of the molding is sandwiched by the clip, and the cutout of the molding is engaged with the molding-cutout engagement portion of the clip. Thus, without any tool, a desirable strong fastening for supporting the molding of the windshield may be provided to firmly fix the molding to the vehicle body. Further, using a blind rivet clamping tool allows the clip to be readily attached so that cost reduction may be facilitated.

The above noted molding fastener assembly has achieved a satisfactory result in that the molding may be readily attached without any tool, and sufficient fastening strength can be achieved after the attaching operations. In this molding fastener assembly, the engagement pawls of the clip have an engagement strength which is slightly lower in the pulling off direction in consideration of replacement and other operations for the molding. Thus, the molding may be detached by pulling off the molding perpendicular to the windshield surface from the clip. However, the strength of the engagement pawls must be dealt with. In order to release the pawls, a dedicated detaching tool is needed. This requires additional cost, time and effort in order to forceably pull off the molding. In this case, the clip may not be reused due to breakage of the engagement pawls. Therefore, to attach a molding in the future, it is necessary to remove the broken clip and to attach a new clip. However, since the broken clip is firmly mounted to the vehicle body by the blind rivet as described above, it was difficult to remove the clip and the rivet and to attach the new clip.

Another prior molding fastener assembly included a blind rivet having a rivet body formed with two separated flanges that were fixed to the vehicle body. A clip was attached to a shank of the rivet body between the two flanges, and a molding was engaged with the clip. In this molding fastener assembly, while the clip was fitted onto and mounted on the shank of the rivet body fixed to the vehicle body, there is no description and suggestion concerning the detaching operation. Also, this is not intended for mounting the side molding of the windshield. Another molding fastener assembly included a clip attached to a T-stud fixed to the vehicle body, and a molding fixed to a vehicle body by engaging the molding with the clip. This molding fastener assembly does not include any disclosure of the clip being fixed to the vehicle body by the use of a blind rivet. In addition, there is no suggestion concerning the detaching operation of the clip. Another prior disclosure is of a plate coupler for fastening inner and outer panels of a door by the use of a blind rivet, and fixing a clip to a vehicle body in conjunction with the attaching operation of the blind rivet. In this coupler, a molding is used to conceal the blind rivet, and the coupler is not intended for fastening a windshield molding. In addition, there is no suggestion concerning the detaching operation of the clip. Also, prior fasteners use a blind rivet having a resin cap for attachment to a panel. The resin cap may be formed with a two-step flange. The distance between the flanges is adequate to allow the resin cap to function as a mount when the blind rivet is fixed to the panel. However, such devices do not disclose a clip for fastening to a molding in attachment, nor does it include any suggestion concerning the detaching operation of the clip.

SUMMARY OF THE PRESENT INVENTION

Thus, it is an object of the present invention to provide a molding fastener assembly capable of allowing a molding to be detached in spite of high fastening forces and capable of removing an accidentally damaged clip and attaching a new clip without any difficulty, and still readily attaching the molding.

In order to achieve the object, the present invention provides a molding fastener assembly comprises a clip including a base to be fixed to a vehicle body and a molding holder integrated with the base, and a blind rivet including a hollow, tubular rivet body having a flange at one end thereof and a mandrel extending through the rivet body beyond the flange from the other tip end thereof opposite to the flange, wherein the blind rivet is adapted to retain the clip to the vehicle body and the retained clip allows a molding to be mounted to the vehicle body by attaching the molding to the retained clip. In this molding fastener assembly, the rivet body has a shank covered with a hollow, tubular resin cap extending from the tip end of the rivet body toward the flange. This resin cap is formed with a flange at a position spaced apart from the flange of the rivet body toward the tip end of the rivet body by a predetermined distance equal to or more than the thickness of the base of the clip. Further, the mandrel is adapted to be pulled off to fix the rivet body with the resin cap to a vehicle body while keeping the flange of the resin cap in contact with the vehicle body and keeping the flange of the rivet body at the predetermined distance from the vehicle body. Furthermore, the base of the clip includes a recess for receiving the shank of the rivet body with the resin cap between the flange of the rivet body and the flange of the resin cap, and an engagement pawl provided at an inlet of the recess. This engagement pawl is formed in a configuration to prevent the shank of the rivet body received in the recess from coming off the recess.

According to this molding fastener assembly, the clip base includes the recess for receiving the rivet body shank with the resin cap between the rivet body flange and the resin cap flange, and an engagement pawl provided at the recess inlet. Further, the engagement pawl is formed in a configuration to prevent the rivet body shank received in the recess from coming off the recess. Thus, the clip may be firmly mounted to the rivet. Further, a strong fastening of the molding may be maintained without any tool, and a simple attaching operation of the molding may also be maintained. Furthermore, in a detaching operation of the molding, the molding may be readily detached with the clip from the rivet by forcedly pulling off the clip from the rivet body shank. If the clip is not broken, the clip may be attached by fitting the clip recess onto the rivet body shank again and a molding may be readily attached. In the detaching operation of the clip, only the clip has a possibility of being broken, but the rivet body (or the resin cap) is never broken. Even if the clip is broken, the rivet body (and the resin cap) fixed to the vehicle body is reusable simply by replacing the clip so that the re-attaching operation may be readily carried out. Thus, the fastening rivet has no possibility of being broken in the detaching operation of the molding so that the detaching operation of the clip and molding may be readily carried our and the re-attaching operation of the new molding may be readily carried out, with leaving the fastening rivet as it is.

In the present invention, the rivet body of the blind rivet may have the above flange as a first flange, and a second flange at a position spaced apart from the first flange toward the tip end of the rivet body by a predetermined distance equal to or more than the thickness of the base of the clip. The mandrel may be adapted to be pulled off to fix the rivet body to a vehicle body while keeping the second flange in contact with the vehicle body and keeping the first flange at the predetermined distance from the vehicle body. The base of the clip may include a recess for receiving the shank of the rivet body between the first and second flanges of the rivet body fixed to the vehicle body, and an engagement pawl is provided at an inlet of the recess. This engagement pawl may be formed in a configuration to prevent the shank of the rivet body received in the recess from coming off the recess. As with the above invention, this allows the clip and molding to be readily detached and allows a new molding to be attached again, with leaving the fastening rivet as it is.

According to the present invention, there are provided a molding fastener assembly comprising a first clip including a base to be fixed to a vehicle body and a molding holder integrated with the base, and clip retaining means for retaining the first clip to the vehicle body, wherein the retaining means is adapted to retain the first clip to the vehicle body and the retained first clip allows a molding to be mounted to the vehicle body by attaching the molding to the retained first clip. In this molding fastener assembly, the retaining means serves as a second clip including a shank adapted to be inserted into a mounting hole of a vehicle body, a first flange provided at one end of the shank, a supporting shank portion extending from the first flange in a direction to extend the shank by a predetermined distance equal to or more than the thickness of the base of the clip, and a second flange provided at the end of the supporting shank portion. This second clip is adapted to be attached to a vehicle body by inserting the shank into the mounting hole of the vehicle body. Further, the base of the first clip includes a recess for receiving the supporting shank portion of the second clip fixed to the vehicle body, and an engagement pawl provided at an inlet of the recess. This engagement pawl is formed in a configuration to prevent the supporting shank portion received in the recess from coming off the recess. Since the second clip is unbreakable, this allows the clip and molding to be readily detached and allows a new molding to be attached again, with the second clip as it is.

In the above molding fastener assembly, in which a molding has been previously fastened to the molding holder of the clip, the base is preferably adapted to be fitted onto and retained by the rivet body shank, or the first clip base is preferably adapted to be retained by the supporting shank portion of the second clip. Thus, the molding may be attached to the vehicle body by carrying the molding and then pushing the molding into the rivet or the second clip without the need of holding the clip. The same applies if the first clip had been involved.

Further, the engagement pawl is preferably provided as a pair engagement pawls, opposed to each other, at the inlet of the recess. In this case, one of engagement pawls is formed to have a lower fastening force than that of the other engagement pawl, and to have a lower strength than that of the shank received in the recess. Thus, even if the clip is broken, the engagement pawl having a lower fastening force will be broken first. This will provide for a secure and stable detaching operation.

BRIEF DESCRIPTION OF THE ACCOMPANYING DRAWINGS

DETAILED DESCRIPTION OF THE INVENTION

Figure 1:
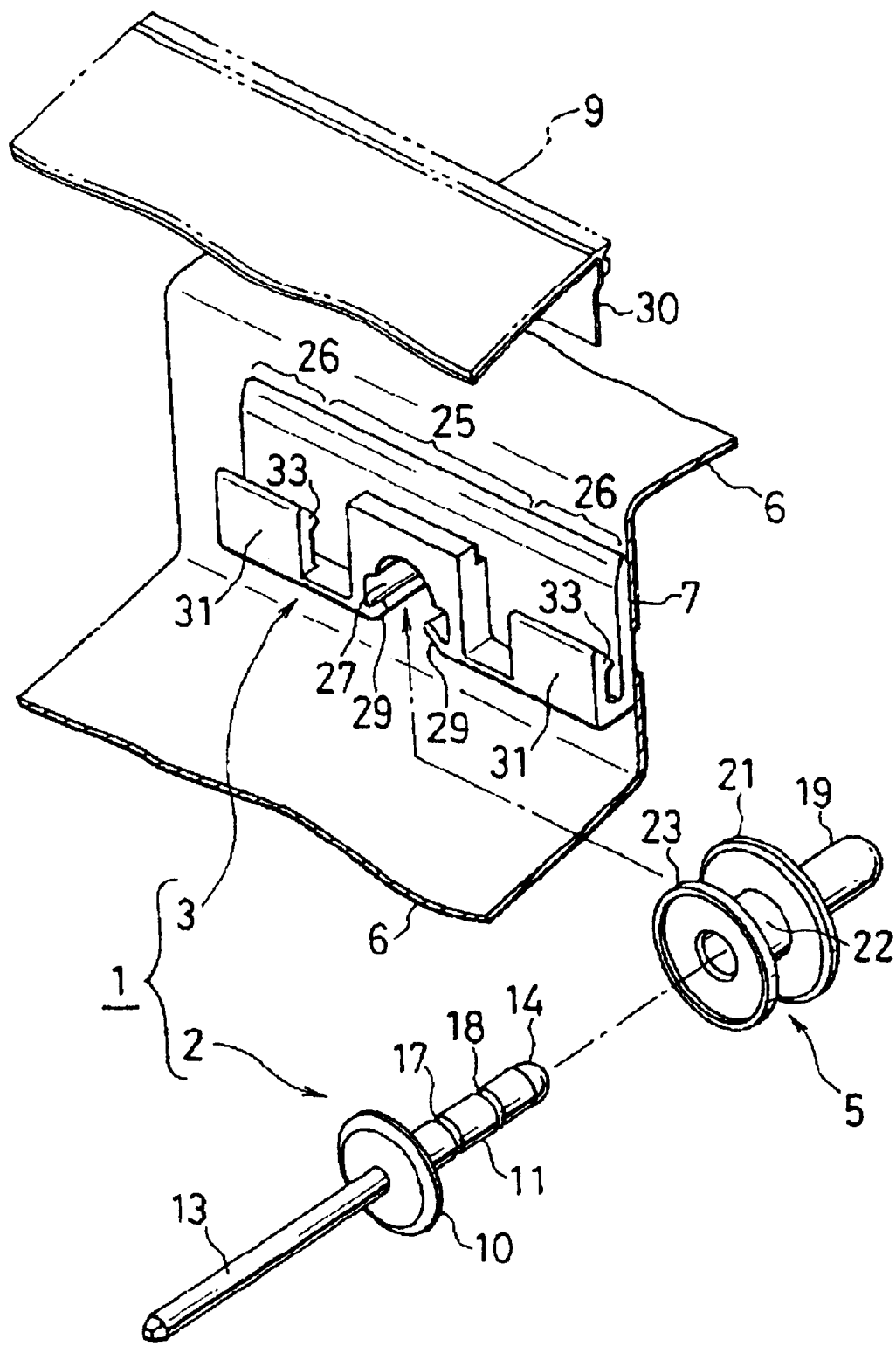
FIG. 1 is an exploded perspective view of a molding fastener assembly according to a first embodiment of the present invention.

With reference to the drawings, embodiments of the present invention will now be described. In FIG. 1, a molding fastener assembly 1 comprises a blind rivet 2 and a clip 3. A resin cap 5 is attached to the blind rivet 2. The molding fastener assembly 1 is suitable for mounting a side molding 9 for filling in the gap between an edge of a windshield (see FIG. 6), such as a shield glass, and a wall surface 7 of a vehicle body 6 adjacent to an opening of the vehicle body (not shown) for mounting the windshield.

Figure 2:
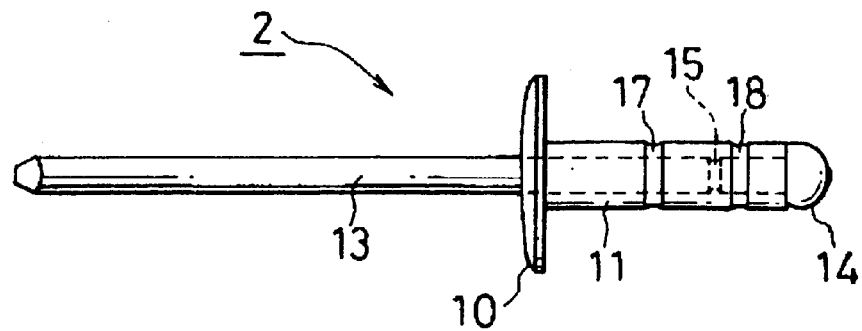
FIG. 2 is a front view of a blind rivet of the molding fastener assembly according to the first embodiment of the present invention.

In FIGS. 1 and 2, the blind rivet 2 comprises a metallic rivet body 11 including hollow shank formed with a flange 10 at one end of the shank, and a metallic mandrel 13 extending through the rivet body 11. The mandrel 13 is formed with a head 14 having an enlarged diameter adjacent to the end of the rivet body 11 opposite to the flange 10. A small diameter portion 15 is also formed in a part of the mandrel 13 between the head 14 and the flange 10, and the small diameter portion is breakable by strongly pulling the mandrel. The mandrel 13 extends from the flange 10 and projects beyond the rivet body 11. This projecting portion is held by a jaw in a nose of a clamping tool (not shown). Small diameter portions 17 and 18 are, but not necessarily, formed in the rivet body 11 and is adequate to cause buckling deformation, depending on a thickness of a vehicle body panel to which the rivet body 11 is fastened. As with conventional blind rivets, the blind rivet 2 may be fastened to the vehicle body 7 or the like as it is. For fastening the blind rivet 2 directly to the vehicle body, the rivet body 11 is inserted from the side of the mandrel head 14 until the surface of the flange 10 comes into contact with the surface defining a mounting hole of the vehicle body. In this state, the exposed portion of the mandrel 13 is held and pulled by the clamping tool to break the small diameter portion 15 of the mandrel. Thus, the head of the mandrel 14 deforms a part of the rivet body 11 to enlarge its diameter radially and outward, and thereby the blind rivet 2 may be fixed to a mounting member, such as a panel, by this deformed enlarged-diameter portion and the flange 10. Since such a blind rivet itself is well known, a more detailed explanation is believed to be unnecessary.

Figure 3:
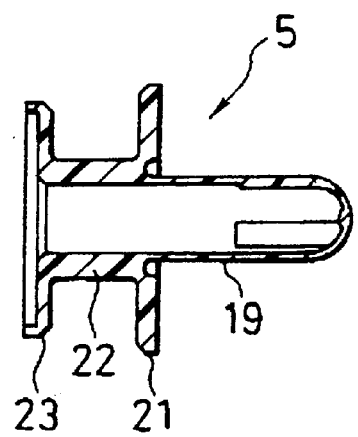
FIG. 3 is a vertical sectional front view of a resin cap of the molding fastener assembly according to the first embodiment of the present invention.

In the present invention, the resin cap 5 is attached onto the rivet body 11 to cover it. In FIGS. 1 and 3, the resin cap 5 has a hollow tubular shank 19 extending from the to head 14 toward the flange 10 of the rivet body 11, and a first flange 21 being a projecting portion projecting radially and outward at a position spaced apart from the end of the resin cap adjacent to the flange 10 by a predetermined distance more than the thickness of the base of the clip 3. In this embodiment, a slightly thick shank 22 extends from the first flange 21. In addition to the first flange 21, this shank 22 is formed with a second flange 23 having a larger diameter than that of the flange 10 at the end of the shank 22 adjacent to the flange 10 of the blind rivet 2. All of the shank 19, the extended shank 22, the first flange 21 and the second flange 23 are integrally molded of plastic. The shank 19 of the resin cap 5 is preferably made of a soft plastic to allow the shank 19 to be readily deformed as the rivet body 11 is deformed. This provides high sealing effect to the mounting hole of the vehicle body. Further, the shank 19 is preferably formed in a tubular member having an end closed at a position corresponding to the head 14 so as to form a complete shield between the outer and inner surfaces of the vehicle body to which the cap 5 is attached. The extended shank 22 of the shank 19 is thickly formed to provide high rigidity. The thickness of the shank 22 will prevent it from being deformed or broken in the fastening operation of the blind rivet 2, and the clip 3 is reliably retained because the clip 3 is engaged with the shank 22. As described above, the resin cap 5 covers the rivet body 11 to provide a rust prevention effect for the covered portion thereof. When the blind rivet 2 is fastened to the vehicle body 6, the resin cap 5 contributes to seal the mounting hole of the vehicle body 6 by preventing water or the like from entering from the outside into the inside of the vehicle body. The second flange 23 serves as a guide for the clip, while it improves sealing performance and the rust prevention effect.

Figure 4:
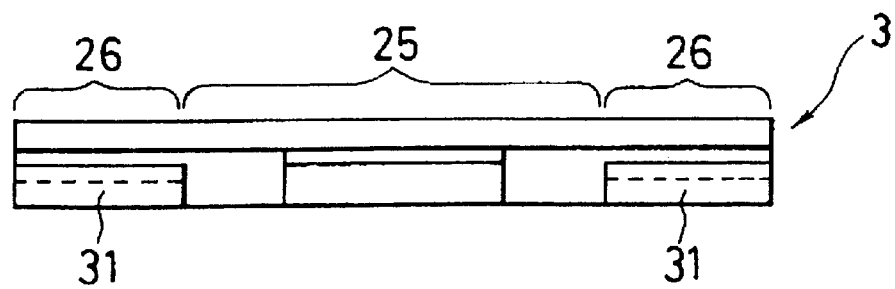
FIG. 4 is a plan view of a clip of the molding fastener assembly according to the first embodiment of the present invention.
Figure 5:
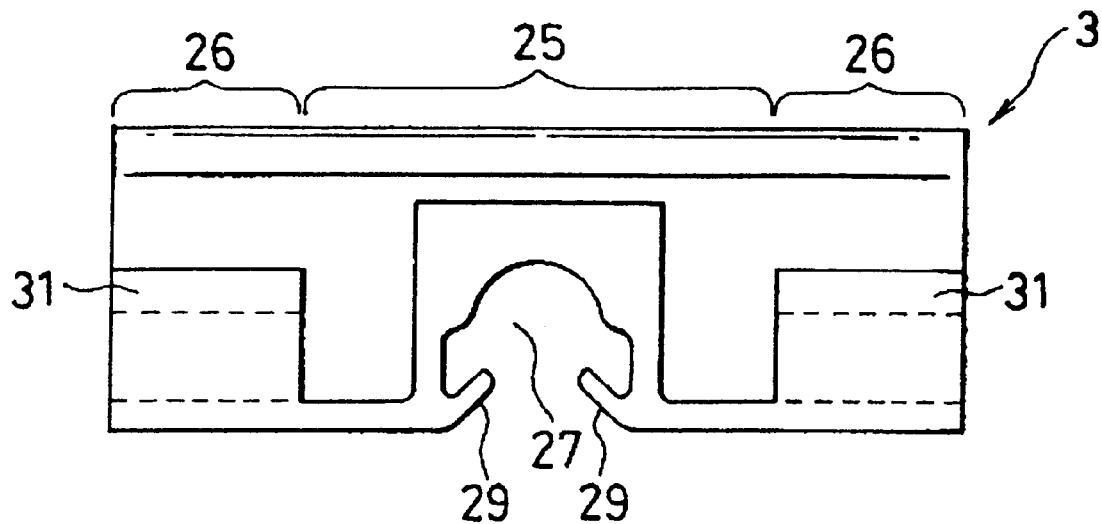
FIG. 5 is a front view of the clip of the molding fastener assembly according to the first embodiment of the present invention.

With reference to FIGS. 1, 3 and 4, the plastic clip 3 will be described. The clip 3 comprises a plate shaped base 25 to be fixed to the vehicle body, and two molding holders 26 continuously extending from the base 25 on both sides of the base 25 with keeping in its flat shape. The clip 3 is formed in the shape of an approximately rectangular body. The base 25 is provided with a recess 27 adapted to receive the shank 22 between the flange 10 of the rivet body 11 fixed to the vehicle body and the first flange 21 of the resin cap 5 and also to receive the shank of the rivet body 11 inside of the shank 22, and a pair of engagement pawls 29 provided at an inlet of the recess 27. As illustrated, each engagement pawl 29 is formed to allow the shank 22 and the rivet body shank to be received in the recess 27. Each engagement pawl 29 is also formed in a configuration to prevent the received shank 22 and rivet body shank from coming off the recess 27. The thickness of the portion of the clip having the recess 27 and the engagement pawls 29 is formed to have a larger thickness than that of another portion of the base 25 to maintain high holding strength.

Each molding holder 26 has a U-shaped clamp portion 31 for receiving and sandwiching the engagement end 30 of the molding 9 to be inserted in a direction parallel to a plane including the molding holder and the base, i.e. in the vertical direction of FIG. 1 (from the top in the illustrated embodiment), and the U-shaped clamp portion 31 is formed with an engagement pawl 33 for engaging with the sandwiched molding engagement end 30 to prevent its coming-off. The upper portion of the engagement pawl 30, i.e. the molding inserting portion is tapered outward to allow the clip 3 to be readily insert into and retained by the molding 9.

In the present invention, the pair of engagement pawls 29 at the inlet of the recess 27 of the base 25 are opposed to each other at the inlet of the recess. One of the engagement pawls 29 is formed to have a lower holding force than that of the other engagement pawl 29. Further, the engagement pawl having the lower holding force is formed to have a lower strength than that of the shank 22 (and the shank of the rivet body 11) received in the recess 27. Thus, in the detaching operation of the clip 3, even if the clip 3 is broken, the engagement pawl having the lower strength is first deformed or broken, and thereby the shank cannot come out of this portion. Thus, the detaching operation of the clip 3 may be reliably and stably carried out.

Figure 6:
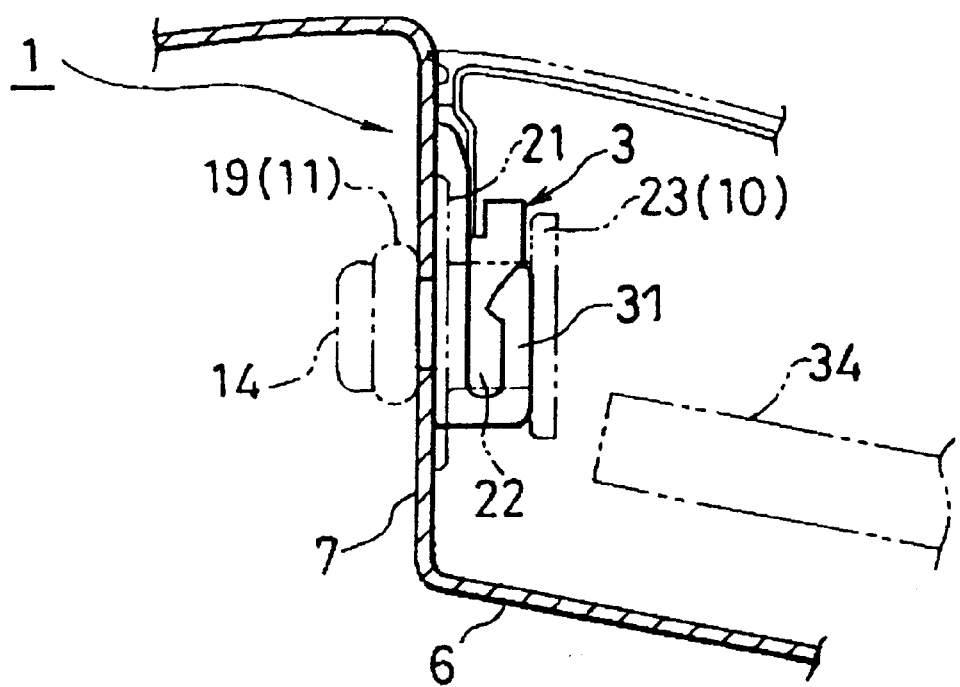
FIG. 6 is a view, partly in section, showing the molding mounted to the vehicle body by mounting the molding fastening assembly to the vehicle body according to the first embodiment of the present invention.

FIGS. 1 and 6 illustrate the blind rivet 2 attached with the resin cap 5, as described above, to be mounted to the vehicle body 6 with the molding 9 mounted to the vehicle body 6 by using the clip 3 as set forth hereinafter. The blind rivet 2 attached with the cap 5 is held by a clamping tool (not shown) with the exposed portion of the mandrel 13 being pushed into a nose of the clamping tool (not shown) from the tip end to the portion adjacent to the flange 10 of the exposed portion. Then, the blind rivet 2 with the cap 5 projecting from the nose of the clamping tool will be inserted into the mounting hole formed in the wall surface 7 of the vehicle body 6 until the shank 19 of the first flange 21 of the cap 5 comes into contact with the wall surface 7. Then, the clamping tool will be actuated to strongly pull the mandrel 13 so as to break the small diameter portion 15 of the mandrel 13 (shown in FIG. 2). Thus, the enlarged-diameter head 14 of the mandrel 13 applies a force for deforming the shank of the rivet body 11 from the tip end to the flange 10 of the shank to enlarge the diameter of the shank radially and outwardly. On the other hand, the two small diameter portions 17 and 18 that are formed in the rivet body 11 and the extended shank 22 of the cap 5 formed between the first flange 21 and the second flange 23 thereof will act to thicken the shank therebetween and cause it to have high rigidity. Thus, the force of the head 14 is concentrated at the flange 21 which is on the side of the head 14 of the rivet body 11 from the first flange 21 to deform this portion and enlarges its diameter radially and outwardly. This deformation also causes the deformation of the cap shank 19. The blind rivet 2 with the cap 5 is fixed to the vehicle body 6 by the deformed rivet body shank, the cap shank 19 and the first flange 21. In this fixing state, not only the enlarged-diameter portion of the rivet body 11 but also the enlarged-diameter portion of the cap shank 19 is fitted tightly on the mounting hole of the vehicle body wall surface 7 to seal the mounting hole. When the cap shank 19 is formed of soft plastic, these enlarged-diameter portions may more closely contact the mounting hole. This provides flexibility for coping with some deformation of the mounting hole, so that the sealing effect is enhanced. Further, the cap shank 19 is closed at its end to shield between the outer and inner surfaces of the panel, so that high air and water tightness is maintained and a high sound insulation effect is also maintained. As to fastening forces, the level of the conventional blind rivet is not lowered. On the contrary, since the diameter of the enlarged-diameter portion becomes larger than that of the conventional blind rivet by adding the enlarged-diameter portion of the cap shank 19, the fastening force will have been increased.

The blind rivet 2 with the cap fixed to the wall surface 7 of the vehicle body 6 defines an engagement portion of the clip 3 including the first flange 21 of the resin cap 5 contacting the wall surface of the vehicle body, and the shank 22 projecting from the first flange to the second flange 23 and the flange 10 of the rivet body 11. Generally, a plurality (for example, five) of blind rivets 2 are fastened at a predetermined intervals to the vehicle body wall surface vertically along a windshield 34 (FIG. 6). The recess 27 is put up to the fastened blind rivet 2 with the resin cap and then the clip 3 is pushed onto as-is. The recess receives the shank 22 and the engagement pawls 29 engage with the shank 22 to fix the clip 3 to the rivet. When the engagement end 30 of the molding 9 is, as shown in FIG. 1, pushed from above into each molding holder 26 of a plurality of the clips 3 mounted to the vehicle body wall surface 7, the molding 9 is retained by each clip 3 and is fixed to the vehicle body 6. Otherwise, the clips 3 may be attached to the molding 9 in advance, and then the molding 9 with the clips may be pushed onto the fastening blind rivet 2. In this case, each clip 3 is attached at each position of the molding 9 corresponding to the predetermined position of the fastening blind rivet 2 mounted to the vehicle body with respect to the molding 9. In this manner, since the attaching operation of the clip may be completed by a molding manufacturer, operations in manufacturing line of vehicles may be reduced, and the labor and time for mounting a plurality of clips one by one may be omitted.

If it is necessary to detach the molding 9 for some reason, it may be achieved by pulling the molding 9 upward. When the molding 9 may be detached from the clip 3 as it is, the clip 3 may be reused. However, there is a case that the molding 9 cannot be pulled out of the clip 3 due to excessive holding strength of the molding holder 26 of the clip 3. In this case, the molding 9 is strongly pulled upward to detach the clip 3 from the clamped rivet body 11 with the cap. This detaching force causes a force acting on the engagement pawls 29 of the clip 3 in the pulling-off direction, and the resulting deformation or breakage of one of the engagement pawls 29 allows the clip 3 to be detached. In this instance, only the clip 3 is broken, but the molding 9 is not broken. In addition, the fastening rivet 2 with the cap is not broken and keeps in a state firmly mounted to the vehicle body. This allows the molding and the fastening rivet to be reused. Thus, the re-attaching operation may be carried out only by installing a new clip.

Figure 7:
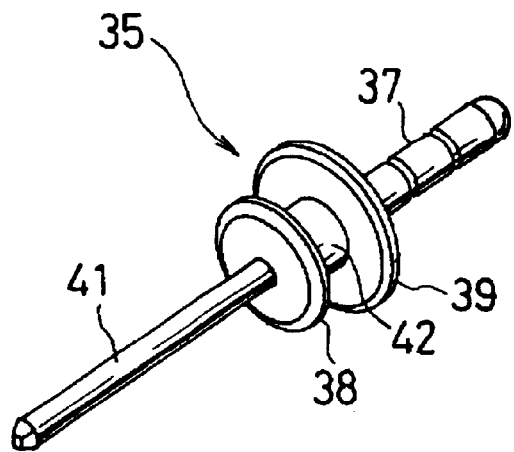
FIG. 7 is a front view of a blind rivet of a molding fastener assembly according to a second embodiment of the present invention.
Figure 8:
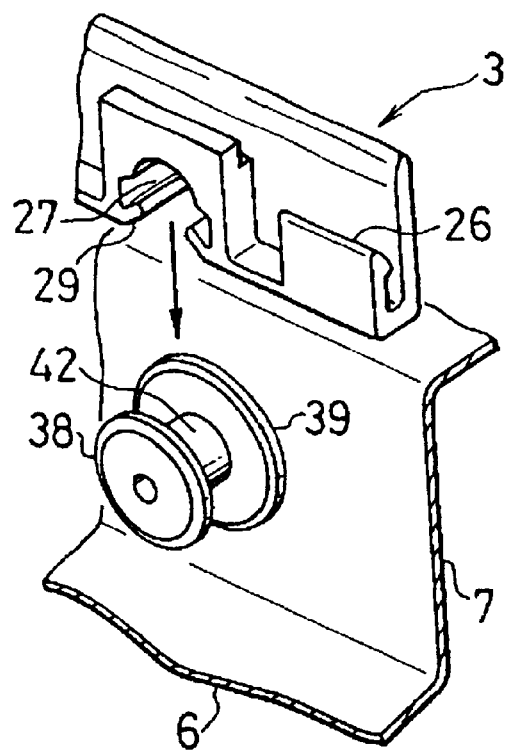
FIG. 8 is an exploded perspective view showing the state of the molding fastener assembly according to the second embodiment of the present invention before the clip is mounted.

FIGS. 7 and 8 show a molding fastener assembly according to the second embodiment of the present invention. In this molding fastener assembly, the clip 3 is the same as that of the first embodiment. In FIG. 7, a blind rivet 35 differs from the blind rivet 2 in that a rivet body 37 is provided with two flanges 38 and 39, and no resin cap is provided. The blind rivet 35 comprises a hollow tubular rivet body 37 formed with a first flange 38 at one end thereof, and a mandrel 41 having a head or enlarged end and extending through the rivet body 37 beyond the first flange 38 from the end of the mandrel opposite to the first flange 38. A shank 42 of the rivet body 37 is formed with a second flange 39 at a position spaced apart from the first flange 38 toward the tip end of the rivet body by a predetermined distance more than the thickness of the base of the clip 3.

In FIG. 8, the blind rivet 35 is clamped and fixed to the wall surface 7 of the vehicle body 6 by the use of a clamping tool (not shown) with the surface of the second flange 39 in contact with the wall surface 7 and the shank 42 extends perpendicularly from the wall surface to the first flange 38. The fastened rivet serves as an engagement portion for the clip 3. Thus, as shown in FIG. 8, when the recess 27 is put up to the shank 42 and fitted onto the shank as it is, the clip 3 is fixed by the function of the engagement pawl 29. Then, a molding is retained and fixed to the vehicle body by fitting the molding into the clip. In this case, it is apparent that the clip may also be attached to the molding in advance and the clip with the molding then may be attached to the fastening rivet. The detaching operation of the molding is the same as that of the first embodiment. Specifically, it may be achieved only by pulling the molding 9 upward, and when the molding may be detached from the clip 3 as it is, the clip 3 may be reused. If the molding 9 cannot be pull off from the clip 3 due to excessive holding strength of the molding holder 26 of the clip 3, the molding 9 is strongly pulled upward to detach the clip 3 from the shank 42. This detaching force causes a force acting on the engagement pawls 29 of the clip 3 in the pulling-off direction, and the resulting deformation or breakage of one of the engagement pawls 29 allows the clip 3 to be detached. While only the clip 3 is broken, the molding 9 is not broken. In addition, the fastening rivet is not broken and keeps in a state firmly mounted to the vehicle body. This allows the molding and the fastening rivet to be reused. Thus, the re-attaching operation may be carried out only by preparing a new clip. These procedures are similar to that described above regarding the first embodiment of the invention shown in FIGS. 1 through 6.

Figure 9:
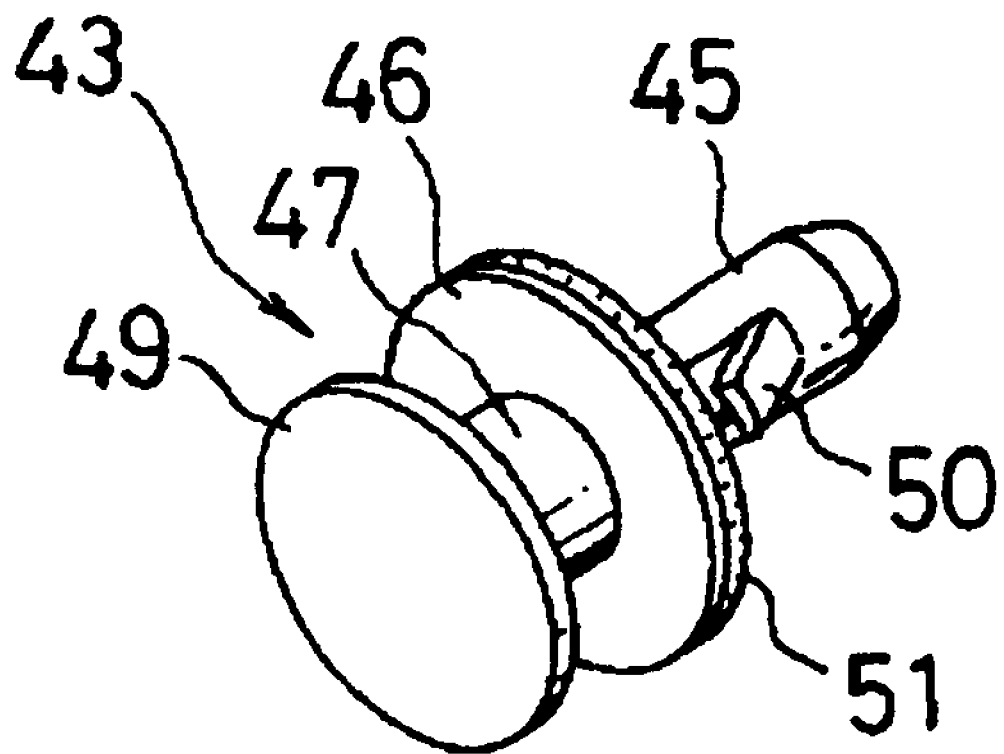
FIG. 9 is a perspective view of a second clip of a molding fastener assembly according to a third embodiment of the present invention.

FIG. 9 shows a clip retaining means of a molding fastener assembly according to a third embodiment of the present invention. In this third embodiment, a blind rivet is not used as the clip retaining means. The clip retaining means is formed as a second clip 43 for retaining the clip 3. Thus, in this embodiment, the clip 3 is called as a first clip. The first clip 3 is the same as the clip 3 of the first embodiment. A second clip 43 as the retaining means for the first clip 3 is integrally molded by plastic, and comprises a shank 45 to be inserted into a mounting hole of a vehicle body, a first flange 46 provided at one end of the shank 45, a supporting shank portion 47 extending in a direction to extend the shank 45 from the first flange 46 by a predetermined distance more than the thickness of the base of the first clip, and a second flange 49 provided at the end of the supporting shank portion 47. The shank 45 is provided with an engagement pawl 50 for engaging with the shank 45 when the shank 45 is inserted into the mounting hole of the vehicle body and pushed to bring the surface of the first flange 46 into contact with the surface of the vehicle body. Further, a resilient packing 51 may be preferably provided on the first flange 46 to stably mount to the vehicle body and prevent water from entering.

In this molding fastener assembly, the detaching operations of the first clip and the molding may be readily carried out, and the re-attaching operation of the molding can also be readily carried out while keeping the second clip 43 in its mounted state to the vehicle body. Specifically, the second clip 43 is fixed to the vehicle body only by inserting the shank 45 of the second clip 43 into the mounting hole of the vehicle body. When the recess 27 of the first clip 3 is then put up to the shank 42 and fitted onto the shank as it is, the first clip 3 is fixed to the second clip 43 by the function of the engagement pawl 29. A first clip retaining means comprising the first flange 46, the supporting shank portion 47 and the second flange 9 is fixed to the vehicle body by the mounted second clip 43. When the recess 27 of the first clip 3 is put up to and fitted onto the supporting shank portion 47 of the fixed second clip 43, the first clip is fixedly retained to the second clip 43. Then, a molding is fixedly retained to the first clip by pushing the molding into the first clip. In this case, it is apparent that the first clip may also be attached to the molding in advance and the first clip with the molding then may be attached to the second clip in a manner described hereinbefore.

The detaching operation of the molding is the same as in the first and second embodiments. Specifically, it may be achieved only by pulling the molding upward, and when the molding may be detached from the first clip as it is, the first clip 3 may be reused. Even if the molding cannot be pull off from the first clip 3, the molding is strongly pulled upward to detach the clip 3 from the supporting shank portion 47 of the second clip 43. This detaching force causes a force acting on the engagement pawls 29 of the clip 3 in the pulling-off direction, and the resulting deformation or breakage of one of the engagement pawls 29 allows the clip 3 to be detached. While only the first clip 3 is broken, the molding 9 is not broken. In addition, the second clip 43 is not broken and keeps in a state firmly mounted to the vehicle body. This allows the molding and the second clip to be reused. Thus, the re-attaching operation may be carried out only by preparing a new first clip.

According to the present invention, the clip may be firmly mounted to the rivet. Further, a strong fastening of the molding may be maintained without any tool, and a simple attaching operation of the molding may also be maintained. Furthermore, in a detaching operation of the molding, the molding may be readily detached with the clip from the rivet by forcedly pulling off the clip from the rivet body shank. If the clip is not broken, the clip may be attached by fitting the clip recess onto the rivet body shank again and a molding may be readily attached. In the detaching operation of the clip, only the clip has a possibility of being broken, but the rivet body (or the resin cap) is never broken. Even if the clip is broken, the rivet body fixed to the vehicle body may be reused only by replacing with a new clip so that the reattaching operation may be readily carried out. Thus, the fastening rivet has no possibility of being broken in the detaching operation of the molding so that the detaching operation of the clip and molding may be readily carried our and the re-attaching operation of the new molding may be readily carried out, with leaving the fastening rivet as it is.

In general, the above identified embodiments are not to be construed as limiting the breadth of the present invention. It is understood that the present invention may be modified or have other alternative constructions that are apparent from and within the scope of the present invention as defined in the appended claims.

What is claimed is:

1. A molding fastener assembly to connect a molding to a vehicle body comprising:

a. a first clip including a base to be fixed to a vehicle body and a molding holder integrated with the base;

b. a clip retaining means for retaining the first clip to the vehicle body;

c. the clip retaining means is adapted to retain the first clip to the vehicle body;

d. the first clip carries a molding to be mounted to the vehicle body;

e. a molding is pre-fastened on the molding holder of the clip;

f. the clip retaining means defines a second clip including a shank adapted to be inserted into a mounting hole of a vehicle body, a first flange provided at one end of the shank, a supporting shank portion extending from the first flange in a direction to extend the shank by a predetermined distance equal to or more than the thickness of the base of the clip, and a second flange provided at the end of the supporting shank portion;

g. the second clip being adapted to be attached to a vehicle body by inserting the shank into the mounting hole of the vehicle body; and h. the base of the first clip includes a recess for receiving the supporting shank portion of the second clip fixed to the vehicle body, and the base of the first clip is adapted to be retained by the supporting shank portion of the second clip;

i. an engagement pawl provided at an inlet of the recess and formed in a configuration to prevent the supporting shank portion received in the recess from coming off the recess;

j. a pair of engagement pawls are opposed to each other at the inlet of the recess of the first clip; and k. one of the engagement pawls is formed to have a lower fastening force than that of the other engagement pawl, and to have a lower strength than that of the shank received in the recess.

* * * * *